(12) United States Patent
Chen et al.

(10) Patent No.: US 9,226,351 B2
(45) Date of Patent: Dec. 29, 2015

(54) COMPACT CONVERTER PLUG FOR LED LIGHT STRINGS

(71) Applicant: 1 ENERGY SOLUTIONS, INC., Agoura Hills, CA (US)

(72) Inventors: Long Chen, Changzhou (CN); Beijing Yu, Guangde (CN); Jing Jing Yu, El Monte, CA (US)

(73) Assignee: 1 Energy Solutions, Inc., Agoura Hills, CA (US)

( * ) Notice: Subject to any disclaimer, the term of this patent is extended or adjusted under 35 U.S.C. 154(b) by 0 days.

(21) Appl. No.: 14/486,933

(22) Filed: Sep. 15, 2014

(65) Prior Publication Data

US 2015/0130360 A1    May 14, 2015

Related U.S. Application Data

(63) Continuation of application No. 12/834,949, filed on Jul. 13, 2010, now Pat. No. 8,836,224.

(30) Foreign Application Priority Data

Aug. 26, 2009 (CN) .......................... 2009 2 0230903
Aug. 27, 2009 (CN) .......................... 2009 2 0231361

(51) Int. Cl.
  *H05B 33/08* (2006.01)
  *H02M 7/00* (2006.01)
  *H01R 13/66* (2006.01)

(52) U.S. Cl.
  CPC .......... *H05B 33/0815* (2013.01); *H02M 7/003* (2013.01); *H01R 13/665* (2013.01); *Y02B 20/19* (2013.01)

(58) Field of Classification Search
  USPC ........... 315/185 S, 185 R, 291, 294, 297, 312
  See application file for complete search history.

(56) References Cited

U.S. PATENT DOCUMENTS

| | | |
|---|---|---|
| 1,694,997 A | 12/1928 | VanHorn |
| 3,425,027 A | 1/1969 | Uberbacher |
| 3,519,913 A | 7/1970 | Janecek |
| 3,593,038 A | 7/1971 | Hylten-Cavallius |
| 3,639,822 A | 2/1972 | Brown |
| 3,758,771 A | 9/1973 | Frohardt |

(Continued)

FOREIGN PATENT DOCUMENTS

CA    2342321    3/2000

OTHER PUBLICATIONS

U.S. Appl. No. 12/542,903, filed Aug. 18, 2009, by Beijing Yu.

(Continued)

*Primary Examiner* — Douglas W Owens
*Assistant Examiner* — Jonathan Cooper
(74) *Attorney, Agent, or Firm* — William W. Cochran; Cochran Freund & Young LLC

(57) ABSTRACT

Disclosed is a compact converter plug that can be used with LED lighting strings. The converter plug has a size and shape that is comparable to a standard wall plug and is capable of plugging into a standard wall socket. The converter plug is waterproof and can be easily assembled. A unique converter circuit is utilized that is compact and highly efficient. Monitoring is performed by a transformer coil that generates a monitoring signal. The converter is controlled by controlling the modulation frequency of a direct current signal using a controller.

12 Claims, 11 Drawing Sheets

(56) References Cited

U.S. PATENT DOCUMENTS

| | | |
|---|---|---|
| 4,035,681 A | 7/1977 | Savage |
| 4,074,165 A | 2/1978 | Moriyama |
| 4,223,248 A | 9/1980 | Tong |
| 4,298,869 A | 11/1981 | Okuno |
| 4,316,125 A | 2/1982 | Noguchi |
| 4,321,598 A | 3/1982 | Warner |
| 4,329,625 A | 5/1982 | Nishizawa |
| 4,348,663 A | 9/1982 | Yanagishima |
| 4,365,244 A | 12/1982 | Gillessen |
| 4,367,471 A | 1/1983 | Gillessen |
| 4,396,823 A | 8/1983 | Nihei |
| 4,492,952 A | 1/1985 | Miller |
| 4,521,835 A | 6/1985 | Meggs |
| 4,528,619 A | 7/1985 | Dolan |
| 4,595,920 A | 6/1986 | Runyan |
| 4,652,981 A | 3/1987 | Glynn |
| 4,675,575 A | 6/1987 | Smith |
| 4,727,603 A | 3/1988 | Howard |
| 4,807,098 A | 2/1989 | Ahroni |
| 4,839,777 A | 6/1989 | Janko |
| 4,843,280 A | 6/1989 | Lumbard |
| 4,857,920 A | 8/1989 | Kataoka |
| 4,954,822 A | 9/1990 | Borenstein |
| 4,959,766 A | 9/1990 | Jain |
| 4,967,330 A | 10/1990 | Bell et al. |
| 5,087,212 A | 2/1992 | Hanami |
| 5,130,897 A | 7/1992 | Kuzma |
| 5,155,669 A | 10/1992 | Yamuro |
| 5,187,377 A | 2/1993 | Katoh |
| 5,193,895 A | 3/1993 | Naruke |
| 5,239,872 A | 8/1993 | Meyer-Bisch |
| 5,257,020 A | 10/1993 | Morse |
| 5,313,187 A | 5/1994 | Choi |
| 5,321,593 A | 6/1994 | Moates |
| 5,323,305 A | 6/1994 | Ikeda |
| 5,366,780 A | 11/1994 | Rapisarda |
| 5,368,503 A | 11/1994 | Savage |
| 5,404,282 A | 4/1995 | Klinke |
| 5,410,458 A | 4/1995 | Bell |
| 5,436,809 A | 7/1995 | Brassier |
| 5,457,450 A | 10/1995 | Deese |
| 5,463,280 A | 10/1995 | Johnson |
| 5,481,444 A | 1/1996 | Schultz |
| 5,499,174 A | 3/1996 | Lin |
| 5,528,484 A | 6/1996 | Hayashi |
| 5,567,037 A | 10/1996 | Ferber |
| 5,580,159 A | 12/1996 | Liu |
| 5,588,863 A | 12/1996 | Wu |
| 5,647,759 A | 7/1997 | Lien |
| 5,649,755 A | 7/1997 | Rapisarda |
| 5,655,830 A | 8/1997 | Ruskouski |
| 5,660,560 A * | 8/1997 | Cheng et al. ............ 439/419 |
| 5,663,719 A | 9/1997 | Deese |
| 5,670,847 A | 9/1997 | Lin |
| 5,672,000 A | 9/1997 | Lin |
| 5,681,107 A | 10/1997 | Wang |
| 5,718,502 A | 2/1998 | Tseng |
| 5,720,544 A | 2/1998 | Shu |
| 5,722,860 A | 3/1998 | Pan |
| 5,726,535 A | 3/1998 | Yan |
| 5,762,419 A | 6/1998 | Yan |
| 5,808,592 A | 9/1998 | Mizutani |
| 5,887,967 A | 3/1999 | Chang |
| 5,890,794 A | 4/1999 | Abtahi |
| 5,936,599 A | 8/1999 | Raymond |
| 5,941,626 A | 8/1999 | Yamuro |
| 5,962,971 A | 10/1999 | Chen |
| 5,969,469 A | 10/1999 | Wang |
| 5,988,831 A | 11/1999 | Pan |
| 6,022,241 A | 2/2000 | Lin |
| 6,048,074 A | 4/2000 | Wang |
| 6,072,280 A | 6/2000 | Allen |
| 6,079,848 A | 6/2000 | Ahroni |
| 6,120,312 A | 9/2000 | Shu |
| 6,183,104 B1 | 2/2001 | Ferrara |
| 6,183,310 B1 | 2/2001 | Shu |
| 6,190,021 B1 | 2/2001 | Huang |
| 6,200,003 B1 | 3/2001 | Tseng |
| 6,217,191 B1 | 4/2001 | Wu et al. |
| 6,227,679 B1 | 5/2001 | Zhang |
| 6,234,649 B1 | 5/2001 | Katougi |
| 6,283,797 B1 | 9/2001 | Wu |
| 6,361,192 B1 | 3/2002 | Fussell et al. |
| 6,361,198 B1 | 3/2002 | Reed |
| 6,367,952 B1 | 4/2002 | Gibboney |
| 6,382,812 B1 | 5/2002 | Hsu |
| 6,461,019 B1 | 10/2002 | Allen |
| 6,478,455 B2 | 11/2002 | Ahroni |
| 6,489,728 B2 | 12/2002 | Guthrie et al. |
| 6,505,954 B2 | 1/2003 | Chen |
| 6,550,953 B1 | 4/2003 | Ichikawa |
| D474,848 S | 5/2003 | Lodhie |
| D474,879 S | 5/2003 | Nason |
| 6,565,244 B1 | 5/2003 | Murphy et al. |
| 6,598,996 B1 | 7/2003 | Lodhie |
| D485,379 S | 1/2004 | Steklenbug |
| 6,709,132 B2 | 3/2004 | Ishibashi |
| 6,717,526 B2 | 4/2004 | Martineau |
| 6,739,733 B1 | 5/2004 | Lamke et al. |
| 6,758,578 B1 | 7/2004 | Chou |
| 6,830,358 B2 | 12/2004 | Allen |
| 7,012,379 B1 | 3/2006 | Chambers et al. |
| 7,014,352 B2 | 3/2006 | Wu |
| 7,045,965 B2 | 5/2006 | Yu |
| 7,063,442 B2 | 6/2006 | Sugar |
| 7,066,628 B2 | 6/2006 | Allen |
| 7,066,636 B2 | 6/2006 | Wu |
| 7,086,756 B2 | 8/2006 | Maxik |
| 7,118,249 B2 | 10/2006 | Hsu et al. |
| 7,172,314 B2 | 2/2007 | Currie et al. |
| 7,217,005 B2 | 5/2007 | Lin |
| 7,220,022 B2 | 5/2007 | Allen et al. |
| 7,350,936 B2 | 4/2008 | Ducharme et al. |
| 7,396,142 B2 | 7/2008 | Laizure, Jr. et al. |
| 7,518,316 B2 | 4/2009 | Yu |
| 7,554,266 B1 | 6/2009 | Chen |
| 7,661,852 B2 | 2/2010 | Yu |
| 7,784,993 B2 | 8/2010 | Yu |
| 7,850,361 B2 | 12/2010 | Yu |
| 7,850,362 B2 | 12/2010 | Yu |
| 7,883,261 B2 | 2/2011 | Yu |
| 7,963,670 B2 | 6/2011 | Yu |
| 8,569,960 B2 | 10/2013 | Chen |
| 2002/0043943 A1 | 4/2002 | Menzer et al. |
| 2002/0097586 A1 | 7/2002 | Horowitz |
| 2002/0105438 A1 | 8/2002 | Forbes et al. |
| 2003/0025120 A1 | 2/2003 | Chang |
| 2003/0031035 A1 | 2/2003 | Kitano |
| 2003/0079387 A1 | 5/2003 | Derose |
| 2003/0147245 A1 | 8/2003 | Chen |
| 2003/0198048 A1 | 10/2003 | Frederick |
| 2004/0135522 A1 | 7/2004 | Berman |
| 2004/0140892 A1 | 7/2004 | Hanood |
| 2004/0184270 A1 | 9/2004 | Halter |
| 2004/0190289 A1 | 9/2004 | Liu |
| 2004/0190290 A1 | 9/2004 | Zerphy et al. |
| 2004/0233145 A1 | 11/2004 | Chiang |
| 2005/0047729 A1 | 3/2005 | Vilgiate |
| 2005/0057187 A1 | 3/2005 | Catalano |
| 2005/0162851 A1 | 7/2005 | Kazar et al. |
| 2005/0174769 A1 | 8/2005 | Yong et al. |
| 2006/0007679 A1 | 1/2006 | Allen |
| 2006/0012349 A1 | 1/2006 | Allen |
| 2006/0012997 A1 | 1/2006 | Catalano |
| 2006/0028194 A1 | 2/2006 | Bosch |
| 2006/0044788 A1 | 3/2006 | Damrau |
| 2006/0098442 A1 | 5/2006 | Yu |
| 2006/0180822 A1 | 8/2006 | Yu |
| 2006/0181884 A1 | 8/2006 | Li |
| 2006/0203482 A1 | 9/2006 | Allen |
| 2006/0256585 A1 | 11/2006 | Pan |
| 2006/0270250 A1 | 11/2006 | Allen |
| 2006/0291256 A1 | 12/2006 | Cobbler |
| 2007/0025109 A1 | 2/2007 | Yu |

(56) References Cited

U.S. PATENT DOCUMENTS

| | | |
|---|---|---|
| 2007/0064450 A1 | 3/2007 | Chiba et al. |
| 2007/0183153 A1 | 8/2007 | Yu |
| 2008/0024071 A1 | 1/2008 | Yu |
| 2008/0025024 A1 | 1/2008 | Yu |
| 2008/0094857 A1 | 4/2008 | Smith et al. |
| 2008/0143234 A1 | 6/2008 | Yu |
| 2008/0157686 A1 | 7/2008 | Chung et al. |
| 2008/0186704 A1 | 8/2008 | Chou et al. |
| 2008/0224623 A1* | 9/2008 | Yu ................................ 315/187 |
| 2008/0258649 A1 | 10/2008 | Yu |
| 2008/0285279 A1 | 11/2008 | Ng et al. |
| 2009/0059565 A1 | 3/2009 | Bertram |
| 2009/0116236 A1 | 5/2009 | Chiang |
| 2009/0302771 A1* | 12/2009 | Peng ............................. 315/193 |
| 2010/0073963 A1 | 3/2010 | Yu |
| 2010/0109560 A1 | 5/2010 | Yu |
| 2010/0264806 A1 | 10/2010 | Yu |
| 2013/0119893 A1 | 5/2013 | Chen |

OTHER PUBLICATIONS

Chinese Patent Application No. 200920172743.1 filed Apr. 20, 2009 by Jing Jing Yu.
U.S. Appl. No. 09/339,616; Inventor: Tuyet Thi Vo; abandoned.
U.S. Appl. No. 09/378,631, Inventor: Tuyet Thi Vo; abandoned.
U.S. Appl. No. 11/716,788, filed Mar. 12, 2007, by Jing Jing Yu.
U.S. Appl. No. 12/098,423, filed Apr. 5, 2008, by Jing Jing Yu.
U.S. Appl. No. 61/043,262, filed Apr. 8, 2008, by Jing Jing Yu.
U.S. Appl. No. 60/949,804, filed Jul. 13, 2007, by Jing Jing Yu.
U.S. Appl. No. 11/957,294, filed Dec. 14, 2007, by Jing Jing Yu.
U.S. Appl. No. 12/431,098, filed Apr. 28, 2009, by Jing Jing Yu.
U.S. Appl. No. 11/350,343, filed Feb. 9, 2006, by Jing Jing Yu.
U.S. Appl. No. 12/610,117, filed Oct. 30, 2009, by Jing Jing Yu.
Non-Final Office Action mailed Jul. 3, 2013 in U.S. Appl. No. 12/834,949, filed Jul. 13, 2010.
Final Office Action mailed Jan. 31, 2014 in U.S. Appl. No. 12/834,949, filed Jul. 13, 2010.

* cited by examiner

US 9,226,351 B2

COMPACT CONVERTER PLUG FOR LED LIGHT STRINGS

CROSS-REFERENCE TO RELATED APPLICATION

This application is a continuation of U.S. application Ser. No. 12/834,949, filed Jul. 13, 2010, which application claims benefit of and priority to Chinese Application Serial No. 200920230903.3, filed Aug. 26, 2009, by Long Chen and Beijing Yu, and Chinese Application Serial No. 200920231361.1, filed Aug. 27, 2009, by Long Chen and Beijing Yu, the entire contents of which are specifically incorporated herein by reference for all that they disclose and teach.

BACKGROUND

Lighting using light emitting diodes is a practical and inexpensive way to provide illumination for various purposes. The advantages of LED lighting are that LEDs operate effectively at low direct current voltages and currents. Further, LED lights produce a large number of lumens for the energy that the LEDs consume. Moreover, LEDs do not generate a significant amount of heat, which renders LED lights a safer alternative to other forms of lighting.

SUMMARY

An embodiment of the present invention may therefore comprise a converter plug for an LED light string that plugs into a household alternating current socket that converts alternating current household power to a low voltage direct current output comprising: an enclosure that is watertight and has a shape and size similar to a wall plug; plug blades that have a watertight seal with the enclosure; a printed circuit board having converter circuitry mounted on at least one surface of the printed circuit board, the printed circuit board mounted in the enclosure, the converter circuitry comprising; a rectifier that rectifies a source of alternating current from a household socket to produce a rectified alternating current signal at an output of the rectifier; a low pass filter, connected to the output of the rectifier, that filters the rectified alternating current signal to provide a filtered, rectified, alternating current signal; a high speed switching transistor that modulates the filtered, rectified, alternating signal to produce a modulated, rectified signal having a selected modulation frequency; a first coil, in a transformer, coupled to the modulated, rectified signal that induces voltage changes in a second transformer coil to produce a second induced voltage and induces voltage changes in a third transformer coil to produce a third induced voltage; a voltage detection circuit connected to the third transformer coil that produces a monitoring signal, without an optical coupler, from the third induced voltage on the third transformer coil that is proportional to the second induced voltage on the second transformer coil; a controller that controls the selected modulation frequency of the modulated, rectified signal in response to the monitoring signal.

An embodiment of the present invention may further comprise a converter plug for use with an LED light string comprising: plug blades that fit in an alternating current wall socket; a housing having an end portion that is molded around the plug blades that provides a watertight seal between the housing and the plug blades; a printed circuit board having converter circuitry mounted thereon, the printed circuit board having pins that provide direct current power from the printed circuit board; an end cap that attaches to the housing so that a watertight seal is created between the end cap and the housing; a connector molded to the end cap having sockets that are electrically connected to the pins on the printed circuit board, the connector having a watertight coupling for coupling the converter plug to the LED light string.

DETAILED DESCRIPTION OF THE EMBODIMENTS

Figure 1:
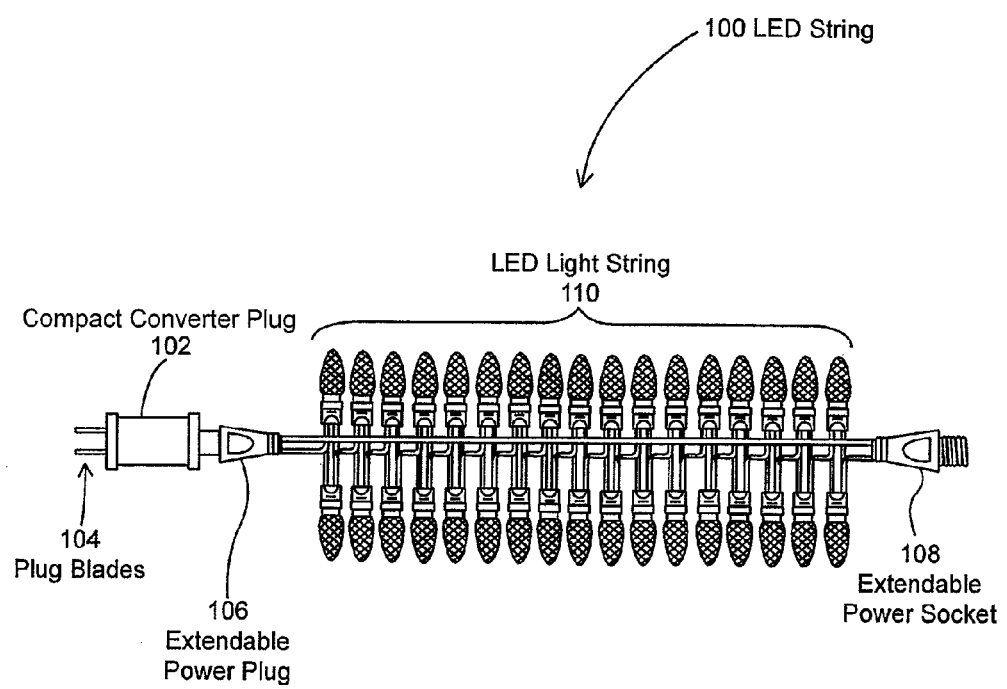
FIG. 1 is schematic view of a circuit layout employing embodiments of the present invention.

FIG. 1 is a schematic diagram of one embodiment of an LED string 100 utilizing a compact converter plug 102. The compact converter plug 102 has plug blades 104 for plugging the compact converter plug 112 into a wall socket, such as a standard 117 volt rms alternating current power source. The miniature converter plug 102 has a small size which is similar to the size of a standard wall plug with a slightly extended length. The LED light string 110 is connected to the compact converter plug 102 using an extendable power plug 106. The extendable power plug 106 can be easily inserted and removed from the compact converter plug 102, while maintaining a watertight seal. Alternatively, the LED light string 110 can be permanently connected to the miniature converter plug 102. At the other end of the LED light string 110, an extendable power socket can be employed, which allows the LED light string 110 to be connected to additional light strings with extendable power plugs, such as extendable power plug 106. In accordance with the embodiments in which the extendable power plug 106 can be disconnected from the miniature converter plug 102, the compact converter plug 102 can be sold separately from the LED light strings 110, which allows the consumer greater options and greater savings in employing multiple or single light strings, such as LED light string 110 in various applications, as desired.

Figure 2:
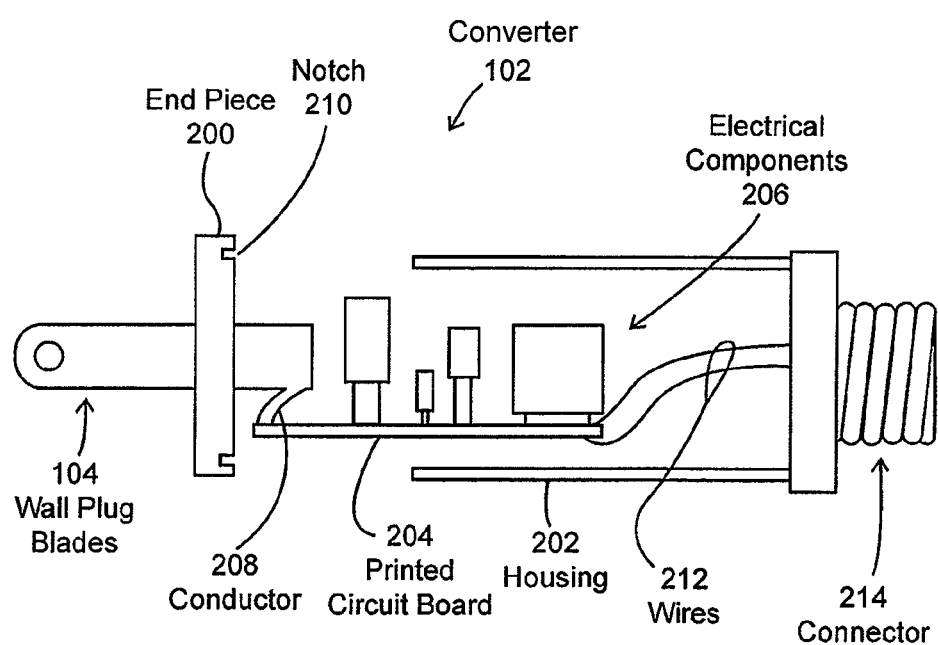
FIG. 2 is an embodiment illustrating an assembly procedure for an converter employed as a plug.

FIG. 2 illustrates the manner in which the converter plug 102 can be assembled. As illustrated in FIG. 2, wall plug blades 104 are mounted in an end piece 200. This process can be achieved by molding the end piece 200 around the wall plug blades 104, using injection molding, such that the wall plug blades 104 are securely mounted and sealed in the front cover 200. Front cover 200 also includes a notch 210, which engages with housing 202 to provide a secure, watertight seal between the front cover 200 and housing 202. A conductor 208 connects the wall plug blades 104 to the printed circuit board 204. Wires 212 connect the printed circuit board 204 to the connector 214. The mating of the housing 202 with the front cover 200 can be by way of a friction fit, ultrasonic welding, or other standard processes for creating a watertight fit. In this manner, the converter plug 102 can be used in outdoor environments while maintaining a watertight seal for the electrical components 206 mounted on the printed circuit board 204 inside housing 202.

Figure 3:
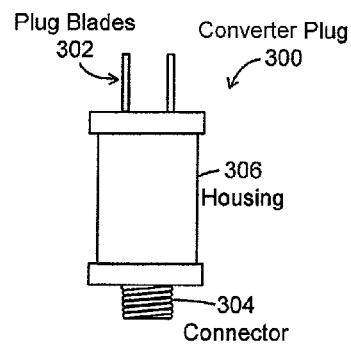
FIGS. 3-6 illustrate various configurations of an converter plug.

FIG. 3 is a side view of one embodiment of an converter plug 300. As shown in FIG. 3, plug blades 302 extend from a first end of the converter plug 300 while connector 304 extends from an opposite end of the converter plug 300. Housing 306 can provide watertight encapsulation of the electrical components within the converter plug 300.

Figure 4:
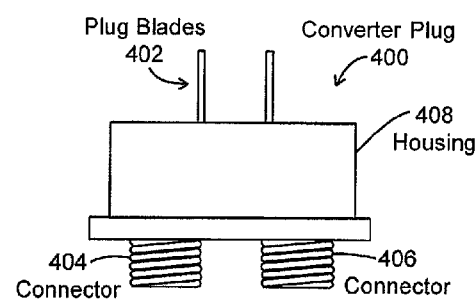

FIG. 4 is a side view of another embodiment of an converter plug 400. As illustrated in FIG. 4, housing 408 encloses the electronic components. Plug blades 402 extend from one end of the housing 408 while connectors 404, 406 extend from the opposite end of the housing 408. In the embodiment illustrated in FIG. 4, two connectors 404, 406 are provided, which are capable of supplying direct current power to two separate LED light strings. Circuitry can be provided for producing direct current outputs to each of the connectors 404, 406.

Figure 5:
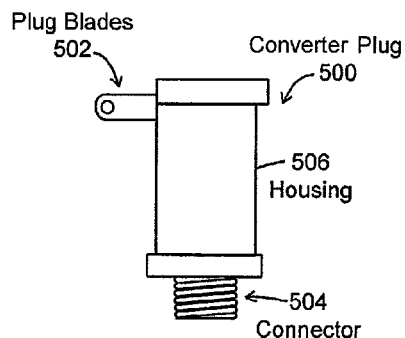

FIG. 5 discloses another embodiment of an converter plug 500. As illustrated in FIG. 5, plug blades 502 extend laterally from the housing 506 at one end of the converter plug 500. Connector 504 extends in a longitudinal direction at the other end of the housing 506. The configuration illustrated in the embodiment of FIG. 5 is useful in situations where there is limited space adjacent the wall socket.

Figure 6:
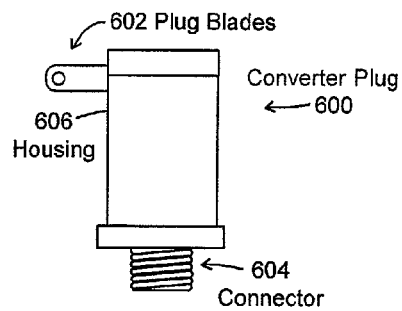

FIG. 6 illustrates another embodiment of an converter plug 600. As disclosed in FIG. 6, plug blades 602 extend laterally from the housing 606. Multiple connectors 604 are provided at an opposite end of the housing 606.

Figure 7:
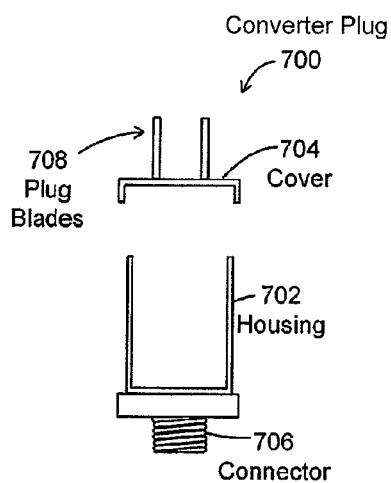
FIGS. 7-10 illustrate various assembly configurations for converter plugs.

FIGS. 7-10 illustrate four different ways of assembling converter plugs. As illustrated in FIG. 7, a cover 704, which has plug blades 708 mounted therein, can be assembled in housing 702 during initial fabrication. Connector 706 is mounted to the housing 702 during initial fabrication of the plug blade 700.

Figure 8:
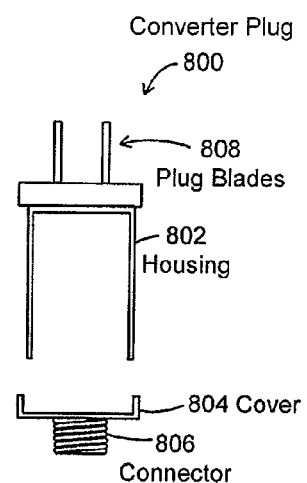

FIG. 8 illustrates an alternative method of assembling an converter plug 800. As illustrated in FIG. 8, plug blades 808 are connected to the housing 802 during initial fabrication. Similarly, connector 806 is connected to cover 804 during initial fabrication. Then, after the electronic circuits are inserted into the housing 802, the cover 804 can be assembled with the housing 802 in accordance with any of the methods described above.

Figure 9:
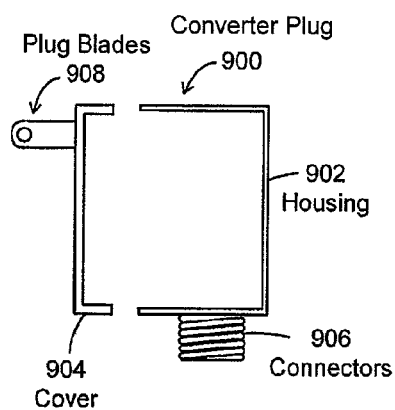

FIG. 9 illustrates another embodiment of a process for assembling an converter plug 900. As shown in FIG. 9, the housing 902 and connectors 906 are assembled in the initial fabrication process. Similarly, plug blades 908 and cover 904 are assembled in the initial fabrication process. After a circuit board is inserted in housing 902, the cover 904 can be assembled and sealed to the housing 902 in accordance with any of the desired methods disclosed above, including ultrasonic welding, heat curing, friction fit assembly and other methods, to create a watertight seal between the cover 904 and housing 902.

Figure 10:
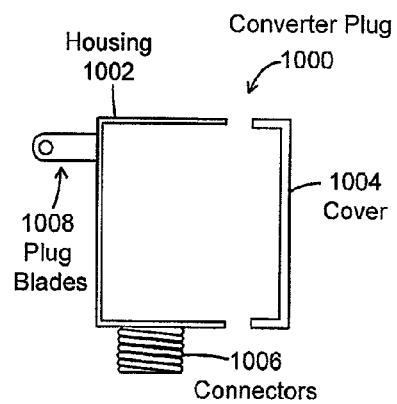

FIG. 10 illustrates another embodiment of a process for assembling an converter plug 1000. As shown in FIG. 10, both the plug blades 1008 and connectors 1006 are initially fabricated and secured to the housing 1002. A printed circuit board and accompanying circuitry is then mounted in the housing 1002, and the electrical connections are made to the plug blades 1008 and connectors 1006. Cover 1004 is then sealed to the housing 1002 using any of the methods disclosed above.

Figure 11:
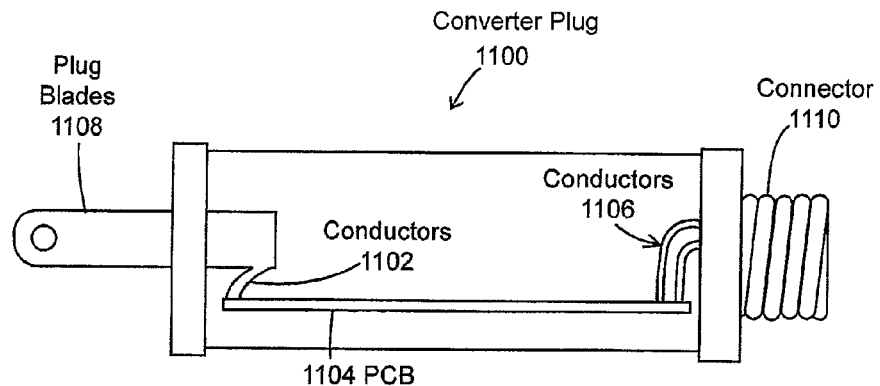
FIGS. 11-13 illustrate various techniques for connecting conductors to a printed circuit board.
Figure 12:
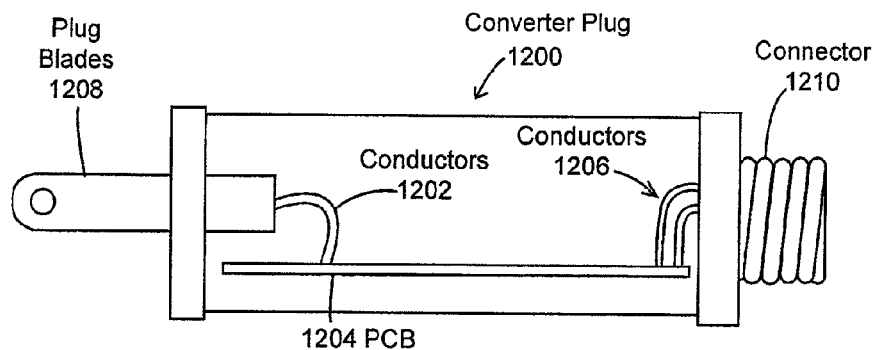
Figure 13:
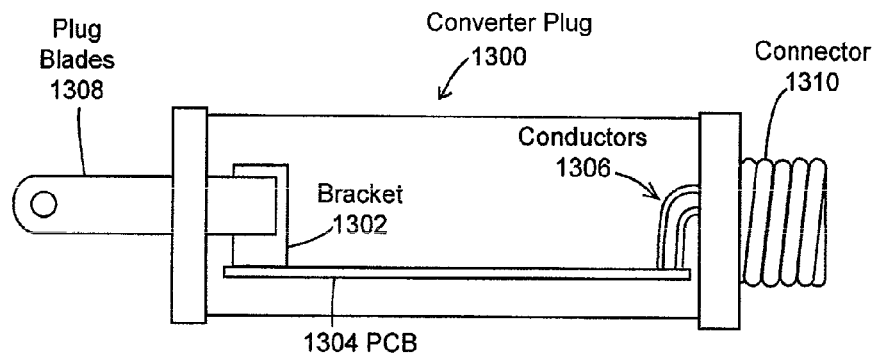

FIGS. 11-13 disclose various processes for connecting a printed circuit board to the plug blades. As disclosed in FIG. 11, a bent metal conductor 1102 is used to connect the printed circuit board 1104 to the plug blades 1108. In addition, conductors 1106 are used to connect the printed circuit board 1104 to the connector 1110.

As illustrated in FIG. 12, wire conductors 1202 are used to connect the printed circuit board 1204 to the plug blades 1208. Conductors 1206, such as wires, are used to connect the printed circuit board 1204 to the connector 1210.

As illustrated in FIG. 13, a socket bracket 1302 is used to connect the plug blades 1308 to the printed circuit board 1304. Conductors 1306 are used to connect the printed circuit board 1304 to the connector 1310.

Figure 14:
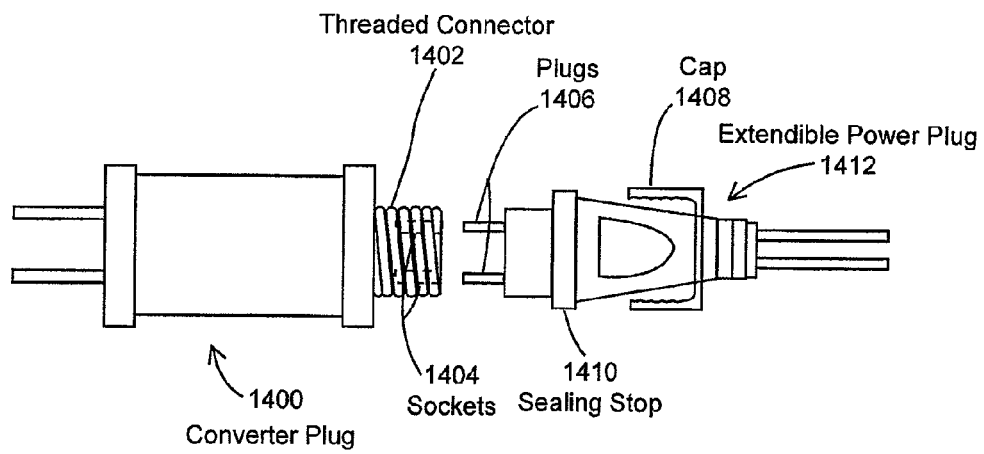
FIGS. 14 and 15 illustrate two embodiments of connectors for connecting a light string to an converter plug.
Figure 15:
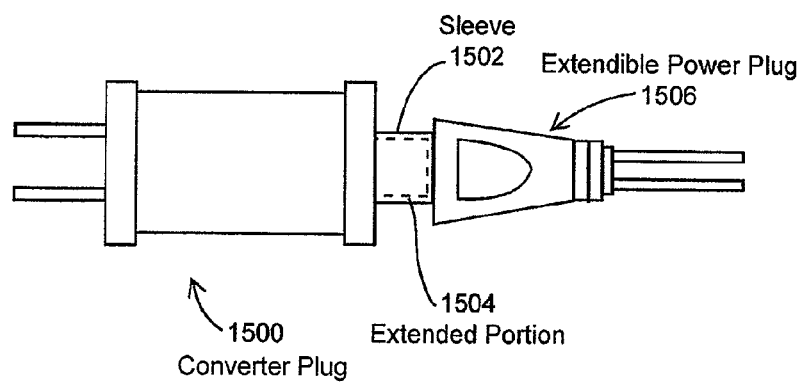

FIGS. 14 and 15 disclose two different embodiments for connecting an extendable power plug to an converter plug. As illustrated in FIG. 14, converter plug 1400 has a pair of sockets 1404 disposed in a threaded connector 1402. Plugs 1406 disposed in an extendable power plug 1412 can be inserted in the sockets 1404 and electrically connected to the sockets 1404. A cap 1408 is threaded on the threaded connector 1402 and seals the extendable power plug 1412 against the sealing stop 1410.

FIG. 15 is an illustration of another embodiment of an converter plug 1500 and an extendable power plug 1506. The extendable power plug 1506 has a sleeve 1502 that slides over an extended portion 1504 of the converter plug 1500, as illustrated by the dotted lines in FIG. 15. Sleeve 1502 creates a friction fit with the extended portion 1504 to create a watertight seal between the sleeve 1502 and the extended portion 1504. Also, a tight slide fit can be created between sleeve 1502 and extended portion 1504 and a locking mechanism provided. Alternatively, sleeve 1502 can be permanently attached to the extended portion 1504, using ultrasonic welding, adhesives, or other methods. The disadvantage in permanently attaching the sleeve 1502 to the extended portion 1504 is that the converter plug 1500 cannot be used with other light strings. For example, the LED light string attached to the extendable power plug 1506 may be damaged and unrepairable. In that case, the converter plug 1500 will have to be discarded with the light string. Of course, the removable extended power plug 1412, illustrated in FIG. 14, allows the converter plug 1400 of FIG. 14 to be used with other light strings.

Figure 16:
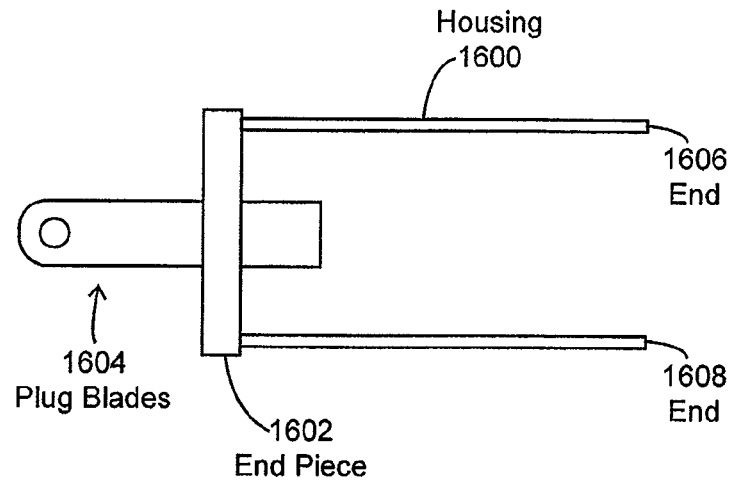
FIGS. 16 and 17 illustrate an assembly process for an converter plug.
Figure 17:
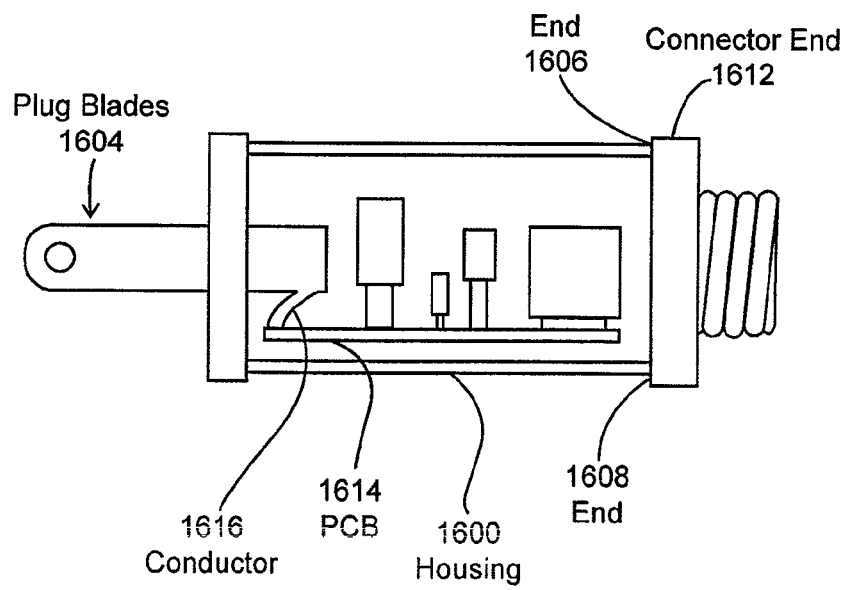

FIGS. 16 and 17 illustrate one method of assembling an converter plug. As illustrated in FIG. 16, plug blades 1604 are molded into an end piece 1602 that encapsulates and surrounds the plug blades 1604. A watertight seal is created between the plug blades 1604 and the end piece 1602. End piece 1602 can be part of the housing 1600 or can be attached to the housing 1600 by various means, including ultrasonic welding, etc. Housing 1600 has ends 1606, 1608 that extend on the open end of housing 1600.

FIG. 17 is a schematic illustration of an assembled converter plug. As illustrated in FIG. 17, plug blades 1604 are secured in the end piece 1602. The printed circuit board 1614 is connected to the plug blades 1604 by conductor 1616. Conductor 1616 may be a bent piece of metal that has a sufficient amount of elasticity so that, when the printed circuit board 1614 is mounted in the housing 1600, an electrical contact is made between the plug blades 1064 and the printed circuit board 1614. In that regard, housing 1600 may include various mounting devices for mounting the printed circuit board 1614 in the housing 1600. As also illustrated in FIG. 17, connector end piece 1612 is attached at ends 1606, 1608 to housing 1600. Attachment can be performed by various methods, including ultrasonic welding and other techniques disclosed herein.

Figure 18:
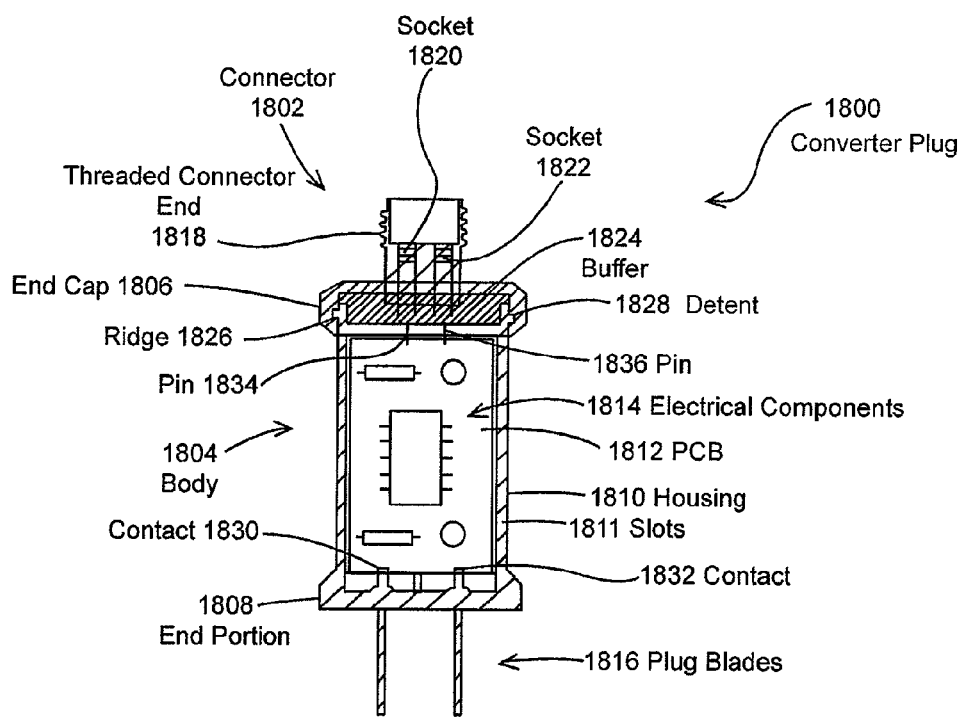
FIG. 18 is a cross-sectional view of an another embodiment of an converter plug.

FIG. 18 is a schematic cutaway view of another embodiment of an converter plug 1800. As illustrated in FIG. 18, the converter plug 1800 includes a connector 1802 and a body 1804. Plug blades 1816 are molded into the end portion 1808 and extend into an interior portion of the converter plug 1800. Printed circuit board 1812 is mounted in housing 1810 by sliding the printed circuit board 1812 into slots 1811, along the sides of housing 1810. Plug blades 1816 abut against contacts 1830, 1832 to make electrical contact with the printed circuit board 1812. Alternatively, wires can be used to connect PCB 1812 to plug blades 1816. Electrical components 1814 are mounted on the printed circuit board 1812 and comprise the converter circuitry necessary to invert the alternating current from a standard household plug, such as a 117 volt RMS alternating current signal, to a low voltage direct current signal that is less than 10 volts.

As further shown in FIG. 18, the printed circuit board has a pair of pins 1834, 1836 that provide the output direct current voltage from the printed circuit board 1812. Pins 1834, 1836 are connected to sockets 1820, 1822, which interface with plugs, such as plugs 1406, illustrated in FIG. 14. End cap 1806, as illustrated in FIG. 18, attaches to housing 1810. As illustrated in the embodiment of FIG. 18, a ridge on the housing 1810 interfaces with a detent 1828 on the end cap 1806 to provide a watertight seal between housing 1810 and end cap 1806. Of course, other methods of attaching the end cap 1806 to the housing 1810 can be used. For example, end cap 1806 may be permanently attached to housing 1810 using ultrasonic welding, melting or other techniques. Buffer 1824 is disposed between the end cap 1806 and the printed circuit board 1812. Buffer 1824 assists in holding the printed circuit board 1812 in place and urging contacts 1830, 1832 against the ends of plug blades 1816 to make an electrical connection between the printed circuit board 1812 and plug blades 1816. The buffer 1824 can be constructed of acrylonitrile butadiene styrene (ABS) or other type of suitable thermoplastic material. Pins 1834, 1836 can be pressed against sockets 1820, 1822, respectively, or otherwise electrically connected using wires (not shown). Connector 1802 also includes a threaded connector end 1818 that allows a watertight connection between an LED string and the converter plug 1800.

Figure 19:
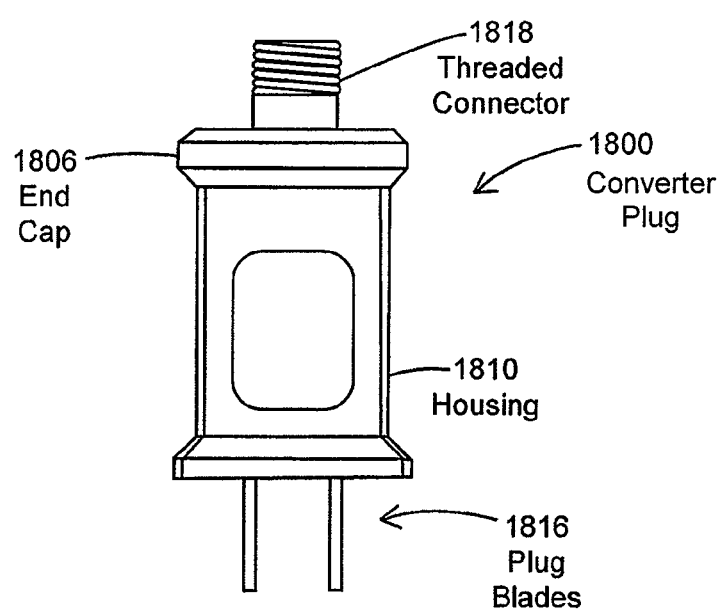
FIG. 19 is a side view of an assembled converter plug of the embodiment of FIG. 18.

FIG. 19 is a side view of the assembled converter plug 1800. As illustrated in FIG. 19, the converter plug 1800 has a general shape and size that corresponds to a standard electric plug to be inserted into an electrical wall socket. As such, the converter plug 1800 is a convenient device for providing direct current power to an LED array because of its size and high efficiency. Threaded connector 1818 allows light strings to be attached and detached from the converter plug 1800, while providing a watertight seal between the converter plug 1800 and an LED light string. End cap 1806 provides a convenient device for attaching the threaded connector 1818 to the housing 1810. As illustrated in various embodiments disclosed above, plug blades 1816 can extend from the end or sides of the converter plug 1800.

Figure 20:
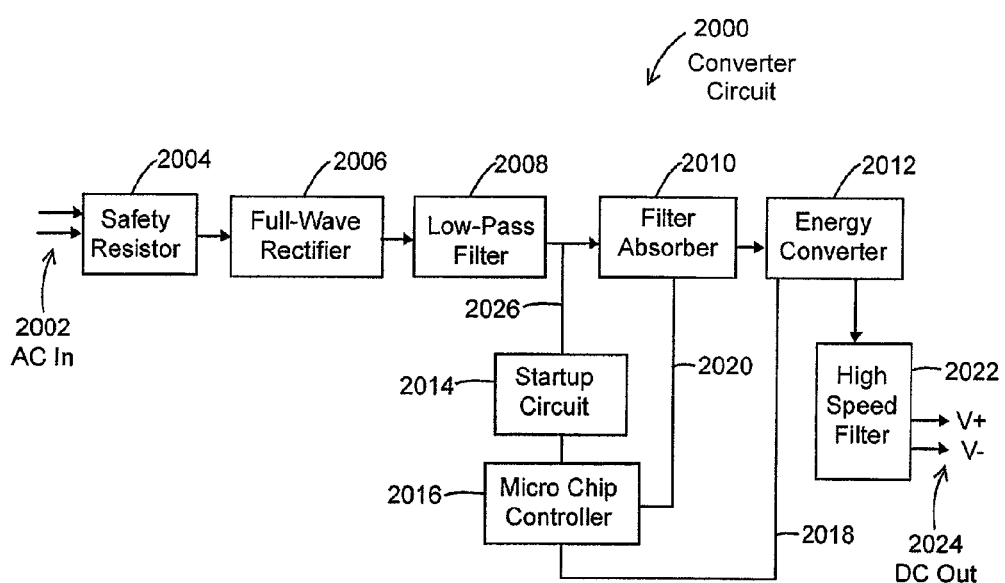
FIG. 20 is a schematic block diagram of an embodiment of an converter circuit.

FIG. 20 is a schematic block diagram of an embodiment of an converter circuit 2000 that can be utilized with any of the embodiments of the converter plug disclosed herein. As illustrated in FIG. 20, an alternating current input 2002 is applied to a safety resistor 2004. Safety resistor 2004 may be a resistive fuse that blows when an excessive amount of current is applied to the converter circuit 2000. The alternating current signal is then applied to a full wave rectifier 2006, which rectifies the alternating current input into a fully rectified signal. Low pass filter 2008 filters out higher frequencies, so that a direct current signal is produced at the input to filter absorber 2010. Filter absorber 2010 absorbs current spikes that protects the microchip controller 2016, energy converter 2012 and other components in the converter circuit 2000. The direct current signal is then applied via connector 2020 to microchip controller 2016. Startup circuit 2014 assists in starting the microchip controller 2016 and providing a source of direct current power to operate the microchip controller 2016. Energy converter 2012 includes a high speed switching circuit and a transformer that reduces the voltage level of the direct current voltage signal. High speed filter 2022 creates the direct current output 2024. This circuit is more fully disclosed in FIG. 21.

Figure 21:
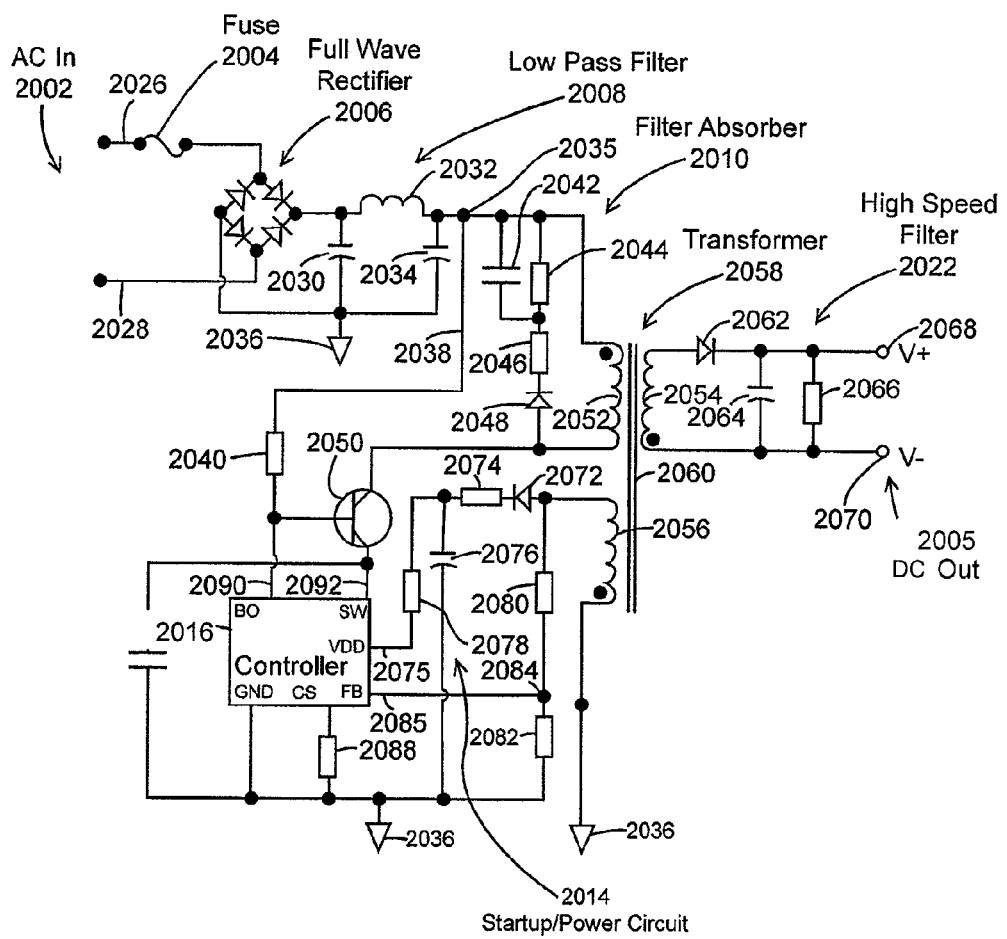
FIG. 21 is a schematic circuit diagram of the embodiment of the converter circuit of FIG. 20.

FIG. 21 illustrates the converter circuit 2000, shown in the block diagram of FIG. 20. As illustrated in FIG. 21, an alternating current signal 2002 is applied to leads 2026, 2028. Fuse (safety resistor) 2004 is a 10 ohm winding resistor installed in the alternating current power input on lead 2026. If a short circuit, or other abnormal condition occurs, fuse 2004 produces an open circuit and prevents the application of the alternating current input power to the converter circuit 2000. Fuse 2004 also limits the current fluctuation during on and off transitions. Full wave rectifier 2006 rectifies the alternating current input 2002 to produce a pulsed direct current voltage. Low pass filter 2008, which comprises capacitors 2030, 2034 and inductor 2032, generates a direct current voltage at node 2035. Lead 2038 applies the direct current voltage to resistor 2040 and to the base of switching transistor 2050. Direct current voltage at node 2035 is also applied to a filter absorber 2010, which comprises capacitor 2042, resistor 2044, resistor 2046, and diode 2048. Filter absorber 2010 protects the switching transistor 2050 from voltage spikes that may occur during operation of the transformer 2058.

The switching transistor 2050, of FIG. 21, is controlled by controller 2016. A suitable controller for use as controller 216 for low power converters, comprises part #FT831B, FT881 from Fremont Micro Devices (SZ) Ltd., #5-8, 10-F, Changhong Science and Technology Building, Ke-Ji Nan 12 Road, Nanshan District, Shenzhen, Guangdong. For higher power converters, part #ACT361, ACT355 is available from Active-Semi, Inc., 2728 Orchard Parkway, San Jose, Calif., 95134, or from iWatt, Inc., 101 Albright Way, Los Gatos, Calif., 95032. Switching transistor 2050 is turned on and off by pins 2090, 2092 of controller 2086, which modulates the direct current voltage at node 2035. Since the direct current voltage at_node 2035 is modulated, the voltage transitions are transmitted from the primary coil 2052 of transformer 2058 to secondary coils 2054, 2056 via transformer core 2060. The transitioning voltage across coil 2052 induces a voltage in secondary coil 2054. The voltage transitions occur in both a positive and negative direction on coil 2052. This causes both positive going and negative going voltage transitions to be induced in secondary coils 2054, 2056.

Diode 2062 only allows the current to pass in the direction of the diode 2062. The high speed filter 2022, which comprises capacitor 2064 and resistor 2066 filters and stores the positive direct current voltage on node 2068 and the negative output direct current voltage on node 2070 of direct current output voltage 2004.

As also illustrated in FIG. 21, the transitioning voltages on primary coil 2052 also create transitioning voltages on secondary coil 2056 that are applied to the startup circuit 2014 and the voltage dividing circuit comprising resistors 2080, 2082. With regard to the startup circuit 2014, diode 2072 only allows passage of current in the direction of the diode 2072.

Resistors 2074, 2078 and capacitor 2076 provide a voltage at pin 2075, which is the VDD voltage that operates the controller 2086. The voltage dividing circuit that comprises 2080, 2082 provides a voltage at node 2084, which is the induced voltage on secondary coil 2056 divided between resistors 2080, 2082. The voltage on node 2084 is applied to the feedback pin 2085 of controller 2086. The voltage at feedback pin 2085 of controller 2086 controls the frequency of switching on nodes 2090, 2092 of controller 2086. When there is no load at the direct current output 2004, the frequency is reduced to achieve energy savings. When a load is present at the direct current output 2004, the frequency of the switching transistor 2050 is increased, which delivers more energy across the transformer 2058 from primary coil 2052 to secondary coil 2056 to support the energy requirements of the load at the direct current output 2004. Secondary coil 2056 has a proportional amount of energy transferred from the primary coil 2052 as the secondary coil 2054, depending upon the number of windings in secondary coil 2054 and secondary coil 2056. Hence, secondary coil 2056 has the same, or a proportional, amount of energy delivered to the secondary coil 2056 as the secondary coil 2054. In other words, the secondary coil 2054 has a certain amount of energy delivered across the transformer 2058 and secondary coil 2056 has the same, or a proportional, amount of energy delivered to it. Hence, the voltage at node 2084, which is applied to the feedback pin 2085, is proportional to the voltage produced at the direct current output 2004. In this manner, the controller 2086 can monitor the voltage that is produced at the direct current output 2004 without any feedback from the direct current output 2004. Optic couplers have been used to provide a feedback loop from an output voltage, such as the direct current output voltage 2004, which provides isolation between a direct current output and a controller, such as direct current output 2004 and controller 2086. Opto-couplers are expensive and bulky. In order to maintain a small package that has a size that is consistent with a wall plug, opto-couplers provide an inconvenient solution that does not meet the size requirements for the miniature converter 102, illustrated in FIG. 1.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A converter plug for an LED light string that plugs into a household alternating current socket that converts alternating current household power to a low voltage direct current output comprising:
    an enclosure that is watertight and has a shape and size similar to a wall plug;
    plug blades that have a watertight seal with said enclosure;
    a printed circuit board having converter circuitry mounted on at least one surface of said printed circuit board, said printed circuit board mounted in said enclosure, said converter circuitry comprising;
    a rectifier that rectifies a source of alternating current from a household socket to produce a rectified alternating current signal at an output of said rectifier;
    a low pass filter, connected to said output of said rectifier, that filters said rectified alternating current signal to provide a filtered, rectified, alternating current signal;
    a high speed switching transistor that modulates said filtered, rectified, alternating signal to produce a modulated, rectified signal having a selected modulation frequency;
    a first coil, in a transformer, coupled to said modulated, rectified signal that induces voltage changes in a second transformer coil to produce a second induced voltage and induces voltage changes in a third transformer coil to produce a third induced voltage;
    a voltage detection circuit connected to said third transformer coil that produces a monitoring signal, without an optical coupler, from said third induced voltage on said third transformer coil that is proportional to said second induced voltage on said second transformer coil;
    a controller that controls said selected modulation frequency of said modulated, rectified signal in response to said monitoring signal.

2. The converter plug of claim 1 further comprising:
    a connector disposed on said enclosure having sockets that are adapted to connect to plugs on said LED light string, said connector being watertight and having a watertight coupler that mates with said LED light string to provide a watertight connection between said connector and said light string, said connector being mounted on, and sealed to, said enclosure so that said enclosure and said watertight connector are watertight, said watertight coupler allowing said converter plug to be disconnected from and directly connected to said LED light string.

3. The converter plug of claim 2 wherein said watertight coupler comprises a cylindrical threaded extension connected to said enclosure that is adapted to mate with a threaded cap disposed on an extendable power plug that forms a portion of said LED light string.

4. The converter plug of claim 3 wherein said watertight coupler comprises an extension that is connected to said enclosure having a surface that creates a watertight friction fit with an extendable power plug of said LED light string.

5. The converter plug of claim 1 wherein said rectifier is a full wave rectifier.

6. The converter plug of claim 1 further comprising:
    a power circuit coupled to said third transformer coil that produces a power signal that powers said controller.

7. A converter plug for use with an LED light string comprising:
    plug blades that fit in an alternating current wall socket;
    a housing having an end portion that is molded around said plug blades that provides a watertight seal between said housing and said plug blades;
    a printed circuit board having converter circuitry mounted thereon, said printed circuit board having pins that provide direct current power from said printed circuit board;
    an end cap that attaches to said housing so that a watertight seal is created between said end cap and said housing;
    a connector molded to said end cap having sockets that are electrically connected to said pins on said printed circuit board, said connector having a watertight coupling for coupling said converter plug to said LED light string;
    a rectifier that rectifies a source of alternating current from a household socket to produce a rectified alternating current signal at an output of said rectifier;

a low pass filter, connected to said output of said rectifier, that filters said rectified alternating current signal to provide a filtered, rectified signal;

a high speed switching transistor that modulates said filtered, rectified signal to produce a modulated, rectified signal having a selected modulation frequency;

a first coil, in a transformer, coupled to said modulated, rectified signal that induces voltage changes in a second transformer coil to produce a second induced voltage and induces voltage changes in a third transformer coil to produce a third induced voltage;

a voltage detection circuit connected to said third transformer coil that produces a monitoring signal, without an optical coupler, from said third induced voltage on said third transformer coil that is proportional to said second induced voltage on said second transformer coil;

a controller that controls said selected modulation frequency of said modulated direct current signal in response to said monitoring signal.

8. The converter plug of claim 7 further comprising:

a power circuit coupled to said third transformer coil that produces a power signal that powers said controller.

9. The converter plug of claim 7 wherein said rectifier is a full wave rectifier.

10. A converter circuit for use in a converter plug for producing a direct current output for an LED light string comprising:

a rectifier that rectifies a source of alternating current from a household socket to produce a rectified alternating current signal at an output of said rectifier;

a low pass filter, connected to said output of said rectifier, that filters said rectified alternating current signal to provide a filtered, rectified, alternating signal;

a filter absorber that protects said converter circuit from voltage spikes;

a high speed switching transistor that modulates said filtered, rectified, alternating signal to produce a modulated, rectified signal having a selected modulation frequency;

a first coil, in a transformer, coupled to said modulated, rectified signal that induces voltage changes in a second transformer coil to produce a second induced voltage and induces voltage changes in a third transformer coil to produce a third induced voltage;

a voltage detection circuit connected to said third transformer coil that produces a monitoring signal, without an optical coupler, from said third induced voltage on said third transformer coil that is proportional to said second induced voltage on said second transformer coil;

a controller that controls said modulation frequency of said modulated direct current signal in response to said monitoring signal.

11. The converter circuit of claim 10 further comprising:

a power circuit coupled to said third transformer coil that produces a power signal that powers said controller.

12. The converter circuit of claim 10 wherein said rectifier is a full wave rectifier.

\* \* \* \* \*